United States Patent
Lakshmanamurthy et al.

(10) Patent No.: US 7,340,570 B2
(45) Date of Patent: Mar. 4, 2008

(54) ENGINE FOR COMPARING A KEY WITH RULES HAVING HIGH AND LOW VALUES DEFINING A RANGE

(75) Inventors: Sridhar Lakshmanamurthy, Sunnyvale, CA (US); Chang-Ming P. Lin, Cupertino, CA (US); Subramanian Anand, Sunnyvale, CA (US); Chen-Chi Kuo, Pleasanton, CA (US); Alok Kumar, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 389 days.

(21) Appl. No.: 10/921,547

(22) Filed: Aug. 18, 2004

(65) Prior Publication Data

US 2006/0041725 A1 Feb. 23, 2006

(51) Int. Cl.
*G06F 12/00* (2006.01)
*H04L 12/28* (2006.01)

(52) U.S. Cl. ............... 711/154; 370/389; 370/392
(58) Field of Classification Search ............ 711/154; 370/389
See application file for complete search history.

(56) References Cited

U.S. PATENT DOCUMENTS

| 6,587,463 | B1 * | 7/2003 | Hebb et al. | 370/392 |
|---|---|---|---|---|
| 6,611,875 | B1 * | 8/2003 | Chopra et al. | 709/245 |
| 6,628,617 | B1 * | 9/2003 | Karol et al. | 370/237 |
| 6,904,057 | B2 * | 6/2005 | Sarkinen et al. | 370/469 |
| 2002/0009076 | A1 * | 1/2002 | Engbersen et al. | 370/389 |
| 2003/0233516 | A1 * | 12/2003 | Davis et al. | 711/108 |
| 2004/0022243 | A1 * | 2/2004 | Jason, Jr. | 370/389 |

OTHER PUBLICATIONS

US-2006-36817 pub. Feb. 16, 2006.
US-2006-69869 pub. Mar. 30, 2006.
Intel IXP1200 Network Processor Family ATM OC-3/12/Ethernet IP Router Example Design, Application Note—Rev. 1.0, Mar. 20, 2002; 58 pp.
Adiletta, et al. "The Next Generation of Intel IXP Network Processors," http://developer.intel.com, c. Intel Corporation 2002; 13 pp.
Adiletta, et al. "Packet over SONET: Achieving 10 Gigabit/sec Packet Processing with an IXP2800," http://developer.intel.com, c. Intel Corporation 2002; 11 pp.

(Continued)

*Primary Examiner*—Sanjiv Shah
*Assistant Examiner*—Daniel Tsui
(74) *Attorney, Agent, or Firm*—Konrad Raynes & Victor LLP; David W. Victor

(57) ABSTRACT

Provided is an engine for comparing a key with rules having defined ranges. A key is received and a rule is accessed including a high and low values defining a range. The key is concurrently compared with the high and low values to determine whether the key falls within a range defined by the high and low values an indication is made in status information the rule in response to the key falling within the defined range of the rule. An additional iteration of accessing a next rule is performed to concurrently compare the key with the high and low values of the next rule, and indication is made in the status information of the next rule in response to the key falling within a range defined by the next rule.

36 Claims, 6 Drawing Sheets

OTHER PUBLICATIONS

Lakshmanamurthy, et al. "Network Processor Performance Analysis Methodology," http://developer.intel.com, c. Intel Corporation 2002; 10 pp.

Naik, et al. "IXA Portability Framework: Preserving Software Investment in Network Processor Applications," http://developer.intel.com, c. Intel Corporation 2002; 11 pp.

* cited by examiner

ENGINE FOR COMPARING A KEY WITH RULES HAVING HIGH AND LOW VALUES DEFINING A RANGE

BACKGROUND

Systems in a network environment communicate information in packets that encapsulate the information according to network communication protocols. Packets transmitted from one node to another node may be transmitted through one or more intervening routers that route the packets throughout the network or between networks. The router typically includes one or more network processors to process the packets. The network processor stores packets in a memory device, such as a Static Dynamic Random Access Memory (SDRAM) and stores packet management information, such as packet queues in a Static Random Access Memory (SRAM).

The network processor may include a plurality of packet engines, each packet engine having code to perform a particular packet processing operation. One packet engine may perform classification operations by reading a packet header from a previous reassembly stage and use the header information to classify the packet. The classification operation may determine an exact match of information in the packet header, such as the source and destination addresses, the source and destination ports, and the protocol fields. The packet engine performing the classification operation may store the data to match against the packet header information in a memory device, such as an SRAM.

The classification operation is one of the most memory and computational intensive tasks performed by a network processor, where operations to compare the key against ranges of values or wild card searches may substantially tax memory capacity and bandwidth.

DETAILED DESCRIPTION

In the following description, reference is made to the accompanying drawings which form a part hereof and which illustrate several embodiments. It is understood that other embodiments may be utilized and structural and operational changes may be made without departing from the scope of the embodiments.

Figure 1:
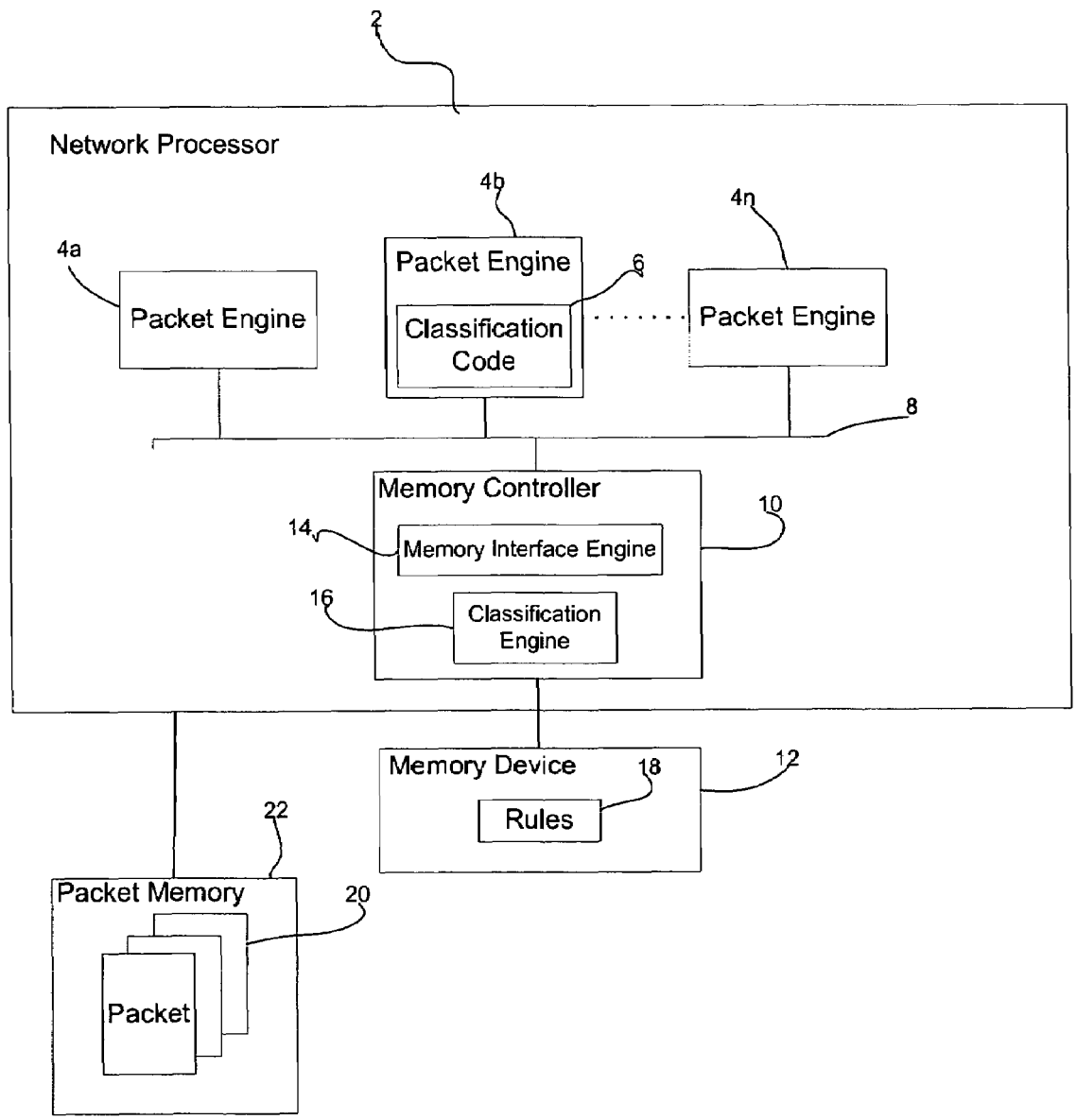
FIG. 1 illustrates a network processor.

A network processor comprises devices that execute programs to handle packets in a data network, such as processors on router line cards, network access equipment and packet forwarding devices. FIG. 1 illustrates one example of a network processor 2 including packet engines 4a, 4b . . . 4n comprising high speed processors specialized for packet processing. The packet engines may comprise any programmable engine or processor for processing packets, such as a microengine, etc. The packet engines may execute program logic, such as microblocks, to process packets, where a microblock comprises fast-path packet processing logic executed by the packet engines 4a, 4b . . . 4n. A packet engine 4b includes classification code 6 to perform classification operations on the packet.

The packet engines 4a, 4b . . . 4n may communicate over one or more bus interfaces 8 to a memory controller 10 providing access to a memory device 12, such as an SRAM or other memory device known in the art. The memory controller 10 includes a memory interface 14 comprising logic to perform memory access operations and a classification engine 16 comprising logic to perform classification operations with respect to header information in a packet. The memory device 12 may be external to the network processor 2 or implemented on an integrated circuit substrate on which the network processor 2 is implemented, i.e., an on-board memory device 12. In certain embodiments, the memory controller 10 is implemented on the integrated circuit substrate including the network processor 2. The memory device 12 may include rules 18 comprising one or more sets of addressable rules to compare with the key value from the packet, where each rule may define a range of values having a high and low values that are compared with key values to determine whether key values fall within or without the range of values defined by the rule. Thus, a rule comprises a statement defining a range of values, having at least one high and low value, to compare against provided values, such as key values, to determine whether the provided values fall within the one or more ranges defined by the rule. In certain situations, the range may be open ended and comprise only one of a high or low value. Different sets of rules within rules 18 may be separately addressable and separately invoked so that a particular one or more sets of addressable rules are selected for the compare operations. In FIG. 1, the rules 18 are shown implemented in the memory device 12. In alternative embodiments, the rules 18 may be implemented in a local memory, i.e., on-board, within the memory controller 10. Packets 20 processed by the packet engines 4a, 4b . . . 4n may be stored in a separate packet memory device 22, such as a SDRAM memory.

Figure 2:
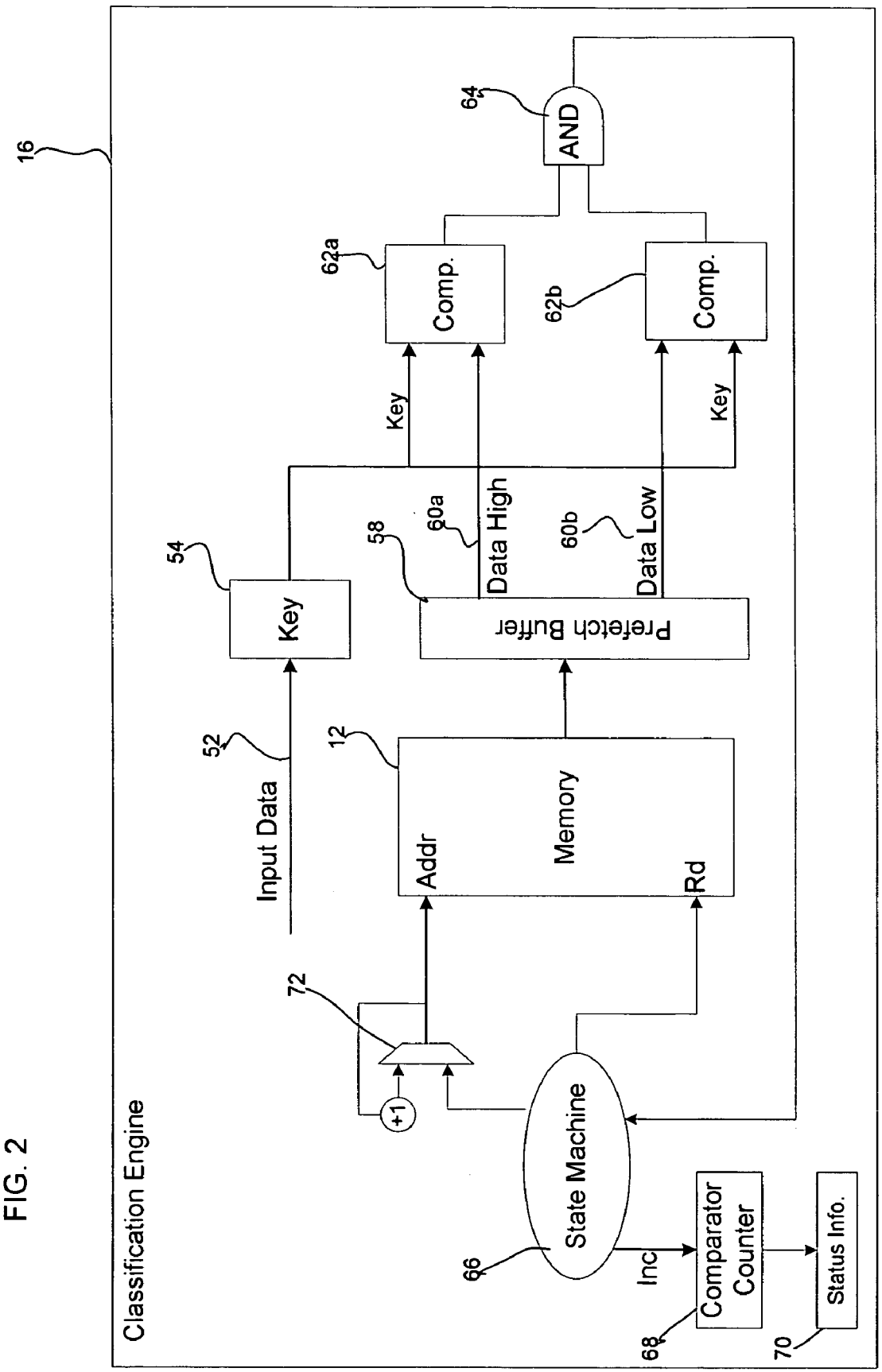
FIG. 2 illustrates a classification engine.

FIG. 2 illustrates an example of an architecture of the classification engine 16 that may be implemented in the memory controller 10 hardware. The classification engine 16 includes an input data line 52 to receive the key 54 from the packet engine 4b. A rule 18 having high and low values is read from the memory 12 device associated with the memory controller 10 and stored in the prefetch buffer 58. The high 60a and low 60b values are then transferred from the prefetch buffer 58 to comparators 62a, 62b, respectively. The comparators 62a and 62b concurrently compare the high and low values 60a, 60b with the received key 54. Comparator 62a may output true ("1") if the key is less than or less than or equal to the high value and output false ("0") if not and comparator 62b may output true ("1") if the key is greater than or greater than or equal to the low value and output false ("0") if not. An AND gate 64 receives the outputs from the comparators 62a, 62b and outputs true ("1") only if both comparators 62a, 62b outputted true, indicating the received key 54 is between the high and low values of the accessed rule. The gate 64 produces a true or false signal to a state machine 66. The state machine 66 increments a comparator counter 68 to keep track of the rule number just processed and updates the status information 70 to indicate a rule defining a range including the key. If there are still rules in the memory 12 to consider, then the state machine 66 signals a multiplexer 72 to assert an incremented address to the memory 12 to transfer the next rule to check to the prefetch buffer 58. The rules may be streamed into the prefetch buffer 58 while one rule is transferred from the prefetch buffer 58 to the comparators 60a to allow the streaming of rules to the comparators 62a, 62b to continually perform the checking operations and minimize latency.

In certain embodiments, the memory interface engine 14 receives a command, such as a write command, from the packet engine 4b, comprising a compare request to compare a key with rules in a rules database. The compare request may include an address of the set of rules to use in the compare operation. The memory interface engine 14 may forward such a compare request, which may comprise a predefined special memory write operation, to the classification engine 16 to execute. If the request is a standard memory access, i.e., not the compare request, then the memory interface engine 14 handles such request.

Figure 3:
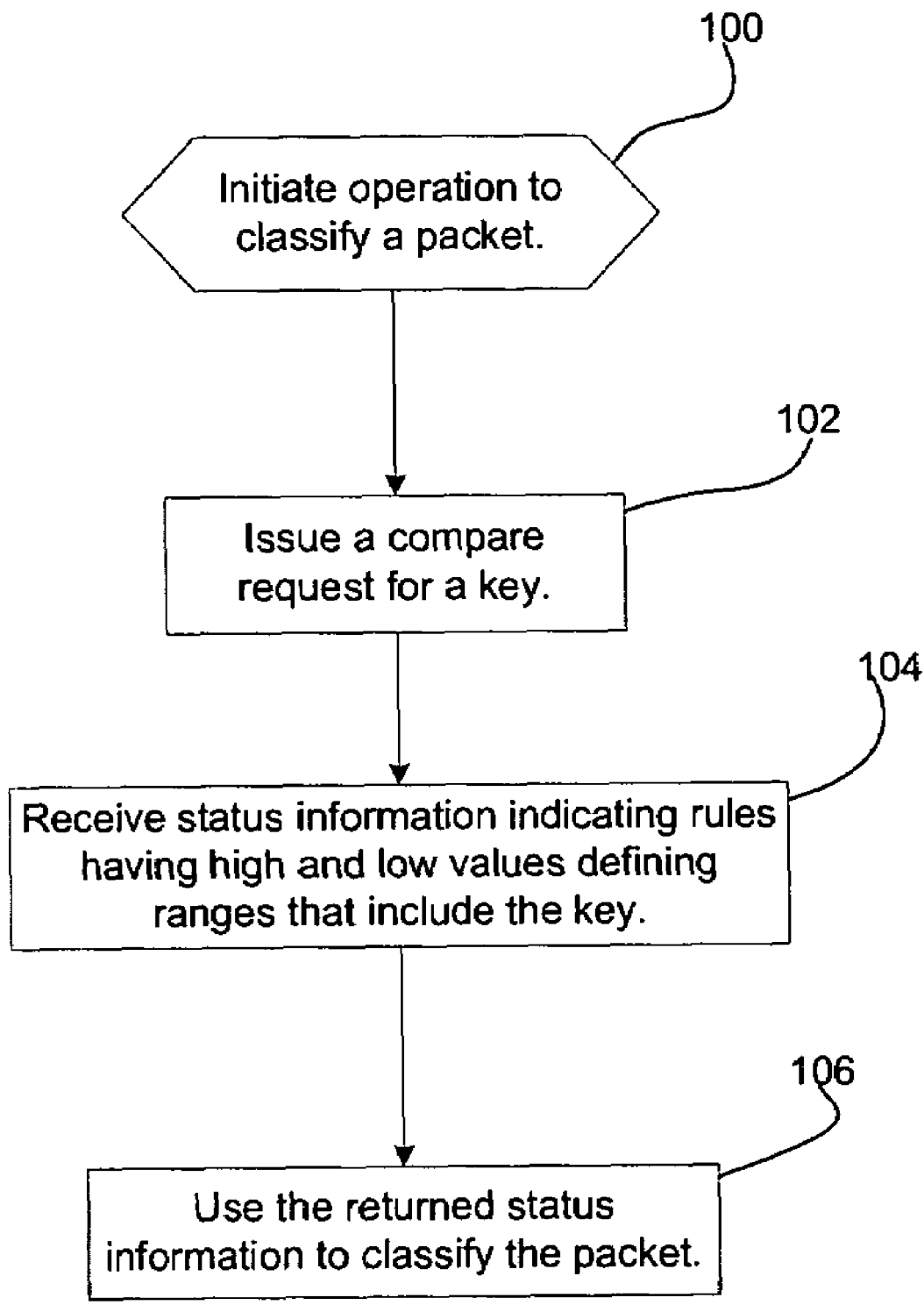
FIGS. 3 and 4 illustrate operations to compare a key against rules defining ranges.

FIG. 3 illustrates operations performed by a programmable engine, such as a packet engine 4b. Upon initiating (at block 100) an operation to classify a packet, the classification code 6 issues (at block 102) a compare request for a key. The programmable engine may comprise a packet engine and the key subject to the compare comprises at least one parameter from a packet. In certain embodiments, the compare request may comprise a special write request to the memory controller 10 that indicates the key to compare and a starting address and size of a set of rules within the rules 18, where each rule defines a range to compare against the key to determine whether the key falls within such defined range. Further, in certain embodiments, if the classification code 6 determines that a single match compare of the key is to be performed, then the classification code 6 may perform such single match compare itself and only submit compare requests to the memory controller 10 when the comparison involves a range of values. The classification code 6 receives (at block 104) status information, e.g., 70, indicating rules defining ranges that include the key. The classification code 6 uses (at block 106) the returned status information 70 to classify the packet including the key submitted to the classification engine 16. For instance, different classifications may depend on the rules 18 that were satisfied. Further, the classification code 6 may issue multiple compare requests to the memory controller 10 for different keys in the headers of a packet and determine one or more classifications for such packet based on the status information results from the different compare operations. After classifying a packet based on compare results from the classification engine 16, the classification code 6 may then forward the packet to a further packet engine 4n to perform additional packet processing thereon.

For instance, the classification code 6 may use the comparison request to determine whether source and target addresses in the packet header fall within one or more ranges of acceptable addresses indicated in the rules 18. If the packet source and target addresses fall within one or more ranges of acceptable addresses, then the network processor may forward the packet to the destination node, else the network processor may drop the packet. Such a classification scheme to allow packets to proceed may be used in a firewall device that screens the addresses to block packets from prohibited addresses or only allow packets to proceed from permissible addresses.

Because multiple packet engines 4a, 4b . . . 4n may be in communication with the memory controller 10 over the set of interfaces 8, the packet engines 4a, 4b . . . 4n may separately submit compare requests to the memory controller 10 to cause the classification engine 16 to compare a submitted key with the rules 18.

Figure 4:
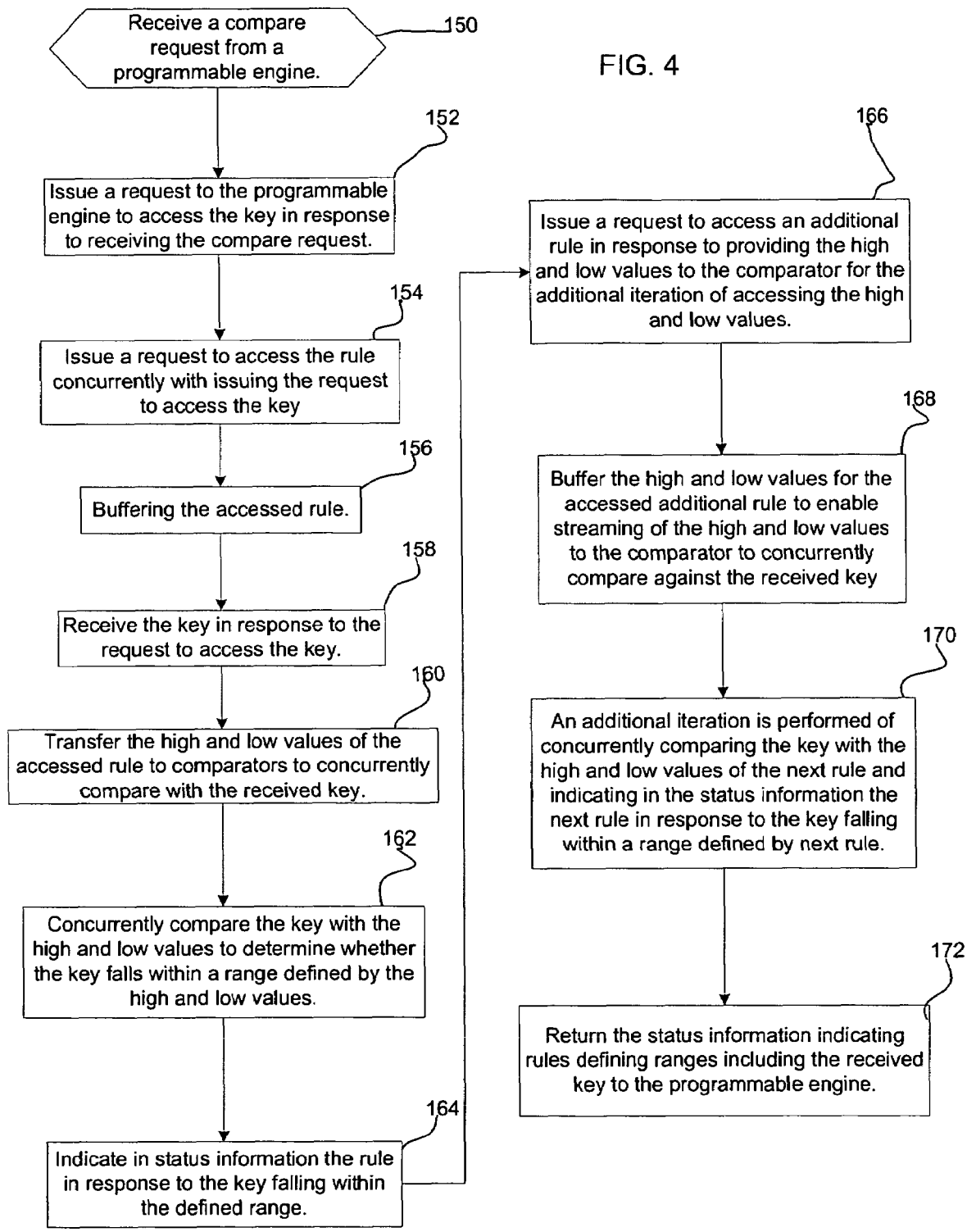

FIG. 4 illustrates operations performed by the classification engine 16 in response to receiving a compare request, which may comprise a write transaction to a memory controller 10. Upon receiving (at block 150) a compare request from a programmable engine, such as packet engine 4b, the classification engine 16 issues (at block 152) a request to the programmable engine, e.g., packet engine 4b, to access the key in response to receiving the compare request. In certain embodiments, in response to the write transaction including the key and address of a set of the rules 18 to compare, the state machine 66 of the classification engine 6 submits a request over the interface 8 to the packet engine 4b for the key. In certain embodiments, the interface 8 may use a de-multiplexed command and data bus architecture and the state machine 66 is optimized to handle such a de-muxed interface 8. The classification engine 16 further issues (at block 154) a request to access a rule concurrently with issuing the request to access the key from the programmable engine. The request to access the rule may comprise a request to read the rule from the memory 12. The accessed rule is buffered (at block 156). For instance, the accessed rule may be buffered in the prefetch buffer 58 in the classification engine 16. In this way, the first rule in the set of rules to compare may be buffered and ready to use while the key is being retrieved from the packet engine 4b over the interface 8.

In certain embodiments, the received compare request indicates an address and size of a set of rules including at least one rule having high and low values. The key is compared with the high and low values of the rules in the set to indicate in the status information 70 rules that define a range including the received key.

Upon receiving (at block 158) the key in response to the request to access the key, the high and low values of the accessed rule are transferred (at block 160) to comparators, e.g., 62a, 62b, to concurrently compare with the received key. The key may then be concurrently compared (at block 162) with the high and low values to determine whether the key falls within a range defined by the high and low values. In certain embodiments, the comparators 62a, 62b concurrently compare the key with the high and low values, respectively, and each return true ("1") if the key satisfies the high and low values, i.e., is less than the high value and greater than the low value. The rule just compared is indicated (at block 164) in the status information 70 in response to the key falling within the range defined by the rule. In certain embodiments, an AND gate 64 (FIG. 2) receives the compare result from the comparators 62a, 62b and if both comparators 62a, 62b return true, i.e., the key satisfied the high and low value conditions, does the AND gate 64 output true to the state machine 66, otherwise false is outputted. Upon receiving the output, the state machine 66 increments a comparator counter 68 to keep track of the rule just processed and indicates the rule in the status information 70 if the output from the AND gate 64 for the rule indicated in the counter 68 is true, i.e., the key falls within the defined range of the indicated rule.

A request is issued (at block 166) to access an additional rule in response to providing the high and low values to the comparator for the additional iteration of accessing the high and low values. The high and low values for the accessed additional rule are buffered (at block 168) to enable streaming of the high and low values to the comparator to compare against the received key. In this way, as the high and low values for each rule are transferred from the prefetch buffer 58 to the comparators 62a, 62b, the state machine 66 prefetches a next rule to the prefetch buffer 58 to stream to the comparators 62a, 62b for a next compare operation. An additional iteration is then performed (at block 170) of concurrently comparing the key with the high and low values of the next rule and indicating in the status information the next rule in response to the key falling within a range defined by the next rule. In this way, the high and/or low values in the rules in the requested set of rules are each compared against the received key to indicate in the status information 70 those rules that were satisfied. The status information 70 indicating rules defining ranges including the received key are returned (at block 172) to the programmable engine. In embodiments where the programmable engine comprises a packet engine 4b, the packet engine 4b may forward the packet and classification information to another packet engine 4n to further process the classified packet.

In certain embodiments, the additional iteration is performed in response to the key not falling within the range defined by the accessed rule and the status information indicates only one rule defining the range including the key. In such implementations, the state machine 66 sends the status information 70 to the packet engine 7b after the key falling within the range defined by one rule and not check further rules 18 after one rule is satisfied.

In further embodiments, the additional iteration is performed in response to a next rule to consider and the status information is enabled to indicate multiple rules defining ranges including the key. In such implementations, the state machine 66 progresses through multiple rules, such as an entire set of rules identified in the compare request from the packet engine 4b, until all such rules are checked and indicates in the status information 70 all rules that were satisfied. In alternative embodiments, the state machine 66 may further indicate all rules that were not passed, i.e., where the key fell outside of the range defined by the rule.

In certain embodiments, the status information 70 may comprise a vector. If the status vector includes only a single bit set to a value, then such single bit indicates whether they key satisfied the criteria of one rule. If the vector includes multiple bits, then each bit may correspond to one of the multiple rules and each bit value indicates the result of the key comparison with the rule corresponding to the bit.

Figure 5:
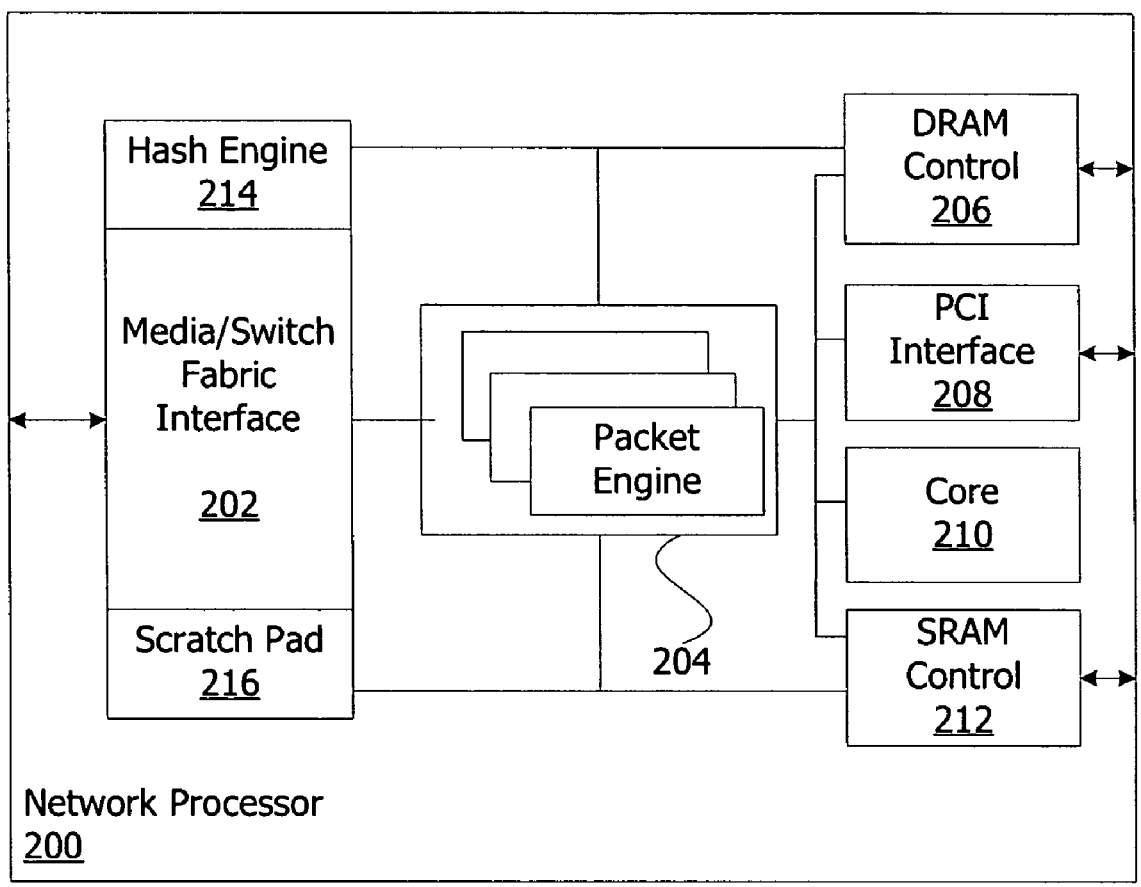
FIG. 5 is a diagram of a network processor.

FIG. 5 illustrates another example of a network processor 200. The network processor 200 shown is an Intel® Internet eXchange network Processor (IXP). Other network processors feature different designs. The network processor 200 shown features a collection of packet engines 204, also known as a microengine, programmable engine, etc. The packet engines 204 may be Reduced Instruction Set Computing (RISC) processors tailored for packet processing. For example, the packet engines 204 may not include floating point instructions or instructions for integer multiplication or division commonly provided by general purpose processors. The network processor 200 components may be implemented on a single integrated circuit die.

An individual packet engine 204 may offer multiple threads. For example, the multi-threading capability of the packet engines 204 may be supported by hardware that reserves different registers for different threads and can quickly swap thread contexts. In addition to accessing shared memory, a packet engine may also feature local memory and a content addressable memory (CAM). The packet engines 204 may communicate with neighboring processors, for example, using neighbor registers wired to the adjacent engine(s) or via shared memory.

The network processor 200 also includes a core processor 210 (e.g., a StrongARM® XScale®) that is often programmed to perform "control plane" tasks involved in network operations. (StrongARM and XScale are registered trademarks of Intel Corporation). The core processor 210, however, may also handle "data plane" tasks and may provide additional packet processing threads.

As shown, the network processor 200 also features interfaces 202 that can carry packets between the processor 200 and other network components. For example, the processor 200 can feature a switch fabric interface 202 (e.g., a CSIX interface) that enables the processor 200 to transmit a packet to other processor(s) or circuitry connected to the fabric. The processor 200 can also feature an interface 202 (e.g., a System Packet Interface Level 4 (SPI-4) interface) that enables to the processor 200 to communicate with physical layer (PHY) and/or link layer devices. The processor 200 also includes an interface 208 (e.g., a Peripheral Component Interconnect (PCI) bus interface) for communicating, for example, with a host. As shown, the processor 200 also includes other components shared by the engines such as memory controllers 206, 212, a hash engine 214, and scratch pad memory 216.

The classification code 6 operations described above may be implemented on a network processor, such as the IXP, in a wide variety of ways. For example, one or more threads of a packet engine 204 may perform specific classification code 6 operations.

In certain embodiments, the packet engine implementing the classification code 6 operations described with respect to FIG. 3 may be implemented in one of the packet engines 204.

Figure 6:
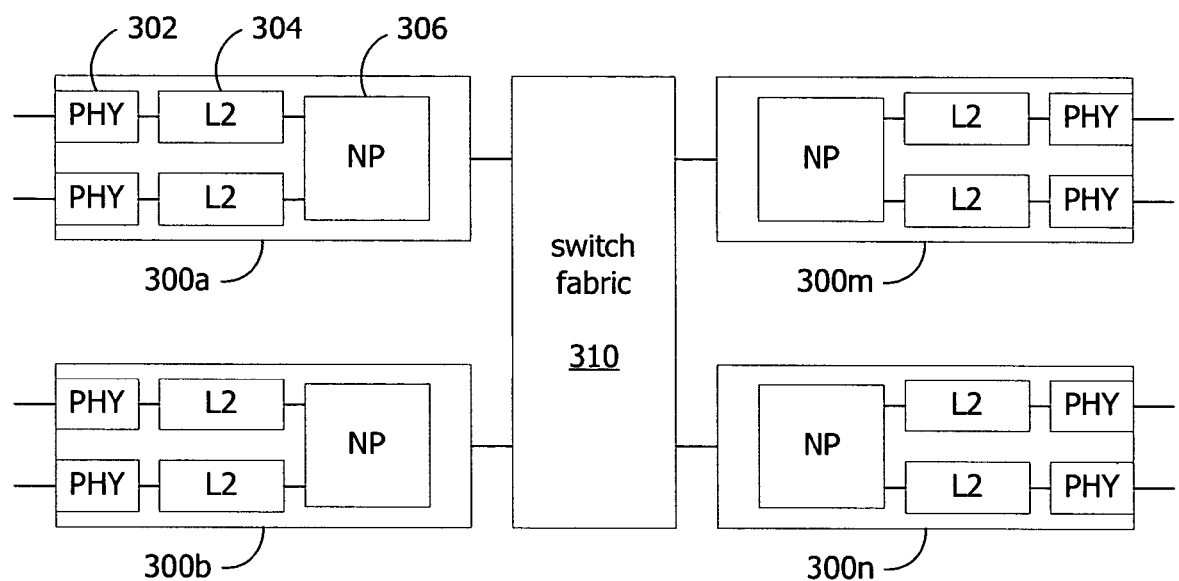
FIG. 6 is a diagram of a network device.

FIG. 6 provides one embodiment of a network device incorporating techniques described above. As shown, the device features a collection of line cards 300 ("blades") interconnected by a switch fabric 310 (e.g., a crossbar or shared memory switch fabric). The switch fabric, for example, may conform to CSIX or other fabric technologies such as HyperTransport, Infiniband, PCI-X, Packet-Over-Synchronous Optical Network (SONET), RapidIO, and Utopia. CSIX is described in the publication "CSIX-L1: Common Switch Interface Specification-L1", Version 1.0, published August, 2000 by CSIX; HyperTransport is described in the publication "HyperTransport I/O Link Specification", Rev. 1.03, published by the HyperTransport Tech. Consort., October, 2001; InfiniBand is described in the publication "InfiniBand Architecture, Specification Volume 1", Release 1.1, published by the InfiniBand trade association, November 2002; PCI-X is described in the publication PCI-X 2.0 Specification by PCI-SIG; SONET is described in the publication "Synchronous Optical Network (SONET)-Basic Description including Multiplex Structure, Rates and Formats," document no. T1X1.5 by ANSI (January 2001); RapidIO is described in the publication "RapidIO Interconnect Specification", Rev. 1.2, published by RapidIO Trade Ass'n, June 2002; and Utopia is described in the publication "UTOPIA: Specification Level 1, Version 2.01", published by the ATM Forum Tech. Comm., March, 1994.

Individual line cards (e.g., 300a) include one or more physical layer (PHY) devices 302 (e.g., optic, wire, and wireless PHYs) that handle communication over network connections. The PHYs translate between the physical signals carried by different network mediums and the bits (e.g., "0"-s and "1"-s) used by digital systems. The line cards 300 may also include framer devices (e.g., Ethernet, Synchronous Optic Network (SONET), High-Level Data Link (HDLC) framers or other "layer 2" devices) 304 that can perform operations on frames such as error detection and/or correction. The line cards 300 shown also include one or more network processors 306 or integrated circuits (e.g., ASICs) that perform packet processing operations for packets received via the PHY(s) 300 and direct the packets, via the switch fabric 310, to a line card providing the selected egress interface. Potentially, the network processor(s) 306 may perform "layer 2" duties instead of the framer devices 304 and the network processor operations described herein.

While FIGS. 5 and 6 described a network processor and a device incorporating network processors, the techniques may be implemented in other hardware, firmware, and/or software. For example, the techniques may be implemented in integrated circuits (e.g., Application Specific Integrated Circuits (ASICs), Gate Arrays, and so forth). Additionally, the techniques may be applied to a wide variety of networking protocols at different levels in a protocol stack and in a wide variety of network devices (e.g., a router, switch, bridge, hub, traffic generator, and so forth).

Additional Embodiment Details

The described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the embodiments, and that the article of manufacture may comprise any information bearing medium known in the art.

The described operations may be performed by circuitry, where "circuitry" refers to either hardware or software or a combination thereof. The circuitry for performing the operations of the described embodiments may comprise a hardware device, such as an integrated circuit chip, Programmable Gate Array (PGA), Application Specific Integrated Circuit (ASIC), etc. The circuitry may also comprise a processor component, such as an integrated circuit, and code in a computer readable medium, such as memory, wherein the code is executed by the processor to perform the operations of the described embodiments.

In certain embodiments, the classification code operations are performed by a process implemented in a microblock executed by a packet engine, e.g., microengine of a network processor. In additional embodiments, the classification code operations may be performed by different types of processors, including central processing units, Input/Output controllers, storage controllers, etc.

In certain embodiments, the classification engine 16 that performs the compare operations of the rules against the key is implemented in a memory controller 10. In alternative embodiments, the classification engine 6 may be implemented in different types of hardware devices, and may be implemented in a hardware device solely devoted to classification engine 6 operations or implemented in a multi-purpose hardware device performing operations in addition to classification engine 6 operations, such as a memory controller.

In described embodiments, the comparison involved a key from a header encapsulating data for transmission over a network. In alternative embodiments, the header may relate to information other than information related to the transmission of a packet over a network.

The term packet was sometimes used in the above description to refer to a packet conforming to a network communication protocol. However, a packet may also be a frame, fragment, ATM cell, and so forth, depending on the network technology being used. Alternatively, a packet may refer to a unit of data transferred from devices other than network devices, such as storage controllers, printer controllers, etc. In such alternative implementations, the key from the header for such alternative packets may include information that is not related to the transmission of a packet over a network.

Preferably, the threads are implemented in computer programs such as a high level procedural or object oriented programming language. However, the program(s) can be implemented in assembly or machine language if desired. The language may be compiled or interpreted. Additionally, these techniques may be used in a wide variety of networking environments.

The illustrated operations of FIGS. 3 and 4 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to limit the embodiments to the precise form disclosed. Many modifications and variations are possible in light of the above teaching.

What is claimed is:

1. A method, comprising:

receiving a compare request;

in response to the compare request, issuing a request to access a rule from memory including a high and low values defining a range concurrently with issuing a request to access a key;

receiving the key;

buffering the accessed rule;

transferring the high and low values of the accessed rule to comparators;

concurrently comparing, with the comparators, the received key with the high and low values to determine whether the key falls within the range defined by the high and low values;

indicating in status information the rule in response to the key falling within the defined range of the rule; and performing an additional iteration of accessing a next rule, concurrently comparing the key with the high and low values of the next rule, and indicating in the status information the next rule in response to the key falling within a range defined by the next rule.

2. The method of claim 1, wherein the compare request is received from a programmable engine and wherein the request to access the key is issued to the programmable engine, wherein the key is received in response to the request for the key.

3. The method of claim 1, further comprising:
issuing a request to access an additional rule in response to transferring the high and low values to the comparators for the additional iteration of accessing the high and low values; and
buffering the high and low values for the accessed additional rule to enable streaming of the high and low values to the comparator to concurrently compare against the received key.

4. The method of claim 1, wherein the received compare request indicates an address and size of a set of rules including at least one rule having high and low values defining a range, wherein the key is compared with the high and low values of the rules in the set to indicate in the status information rules defining ranges including the received key.

5. The method of claim 2, further comprising:
returning the status information indicating rules having high and low values defining ranges including the received key to the programmable engine.

6. The method of claim 1, wherein the status information comprises a vector including a plurality of bits, each corresponding to one rule, wherein bit values for the bits indicate whether the key falls within the defined ranges of the rules.

7. The method of claim 5, wherein the programmable engine comprises a packet engine and wherein the key comprises at least one parameter from a packet, and wherein the programmable engine uses the returned status information to classify the packet including the key.

8. The method of claim 1, wherein the additional iteration is performed in response to the key not falling within the range defined by the accessed rule, and wherein the status information indicates only one rule defining the range including the key.

9. The method of claim 1, wherein the additional iteration is performed in response to a next rule to consider, wherein the status information is enabled to indicate multiple rules defining ranges including the key.

10. The method of claim 1, further comprising:
issuing, with a programmable engine, a compare request for the key, wherein the key is received in response to the compare request; and
receiving, with the programmable engine, the status information.

11. The method of claim 2, wherein the operations of receiving the key, accessing the rule, concurrently comparing the key, indicating the status information, and performing the additional iteration are performed within a memory controller of a memory device in communication with the programmable engine, wherein the memory controller receives the compare request.

12. A memory device, comprising:
a memory including at least one rule;
a memory controller including comparators and circuitry enabled to perform:
receiving a compare request;
in response to the compare request, issuing a request to access a rule in the memory including a high and low values defining a range concurrently with issuing a request to access a key;
receiving the key;
buffering the accessed rule;
transferring the high and low values of the accessed rule to the comparators;
concurrently comparing, with the comparators, the received key with the high and low values to determine whether the key falls within the range defined by the high and low values;
indicating in status information the rule in response to the key falling within the defined range of the rule; and
performing an additional iteration of accessing a next rule, concurrently comparing the key with the high and low values of the next rule, and indicating in the status information the next rule in response to the key falling within a range defined by the next rule.

13. The memory device of claim 12, in communication with a programmable engine, wherein the memory controller circuitry receives the compare request from the programmable engine and wherein the memory controller circuitry issues the request to the programmable engine to access the key in response to receiving the compare request, wherein the key is received in response to the request for the key.

14. The memory device of claim 12, wherein the memory controller circuitry is further enabled to perform:
issuing a request to access an additional rule from the memory in response to transferring the high and low values to the comparators for the additional iteration of accessing the high and low values; and
buffering the high and low values for the accessed additional rule to enable streaming of the high and low values to the comparator to concurrently compare against the received key.

15. The memory device of claim 12, wherein the received compare request indicates an address and size of a set of rules including at least one rule having high and low values defining a range, wherein the key is compared with the high and low values of the rules in the set to indicate in the status information rules defining ranges including the received key.

16. The memory device of claim 12, in communication with a programmable engine, wherein the memory controller circuitry is farther enabled to perform:
returning the status information indicating rules having high and low values defining ranges including the received key to the programmable engine.

17. The memory device of claim 16, wherein the status information comprises a vector including a plurality of bits, each corresponding to one rule, wherein bit values for the bits indicate whether the key falls within the defined ranges of the rules.

18. The memory device of claim 16, wherein the programmable engine comprises a packet engine and wherein the key comprises at least one parameter from a packet, and wherein the programmable engine uses the returned status information to classify the packet including the key.

19. The memory device of claim 12, wherein the additional iteration is performed in response to the key not falling within the range defined by the accessed rule, and wherein the status information indicates only one rule defining the range including the key.

20. The memory device of claim 12, wherein the additional iteration is performed in response to a next rule to consider, wherein the status information is enabled to indicate multiple rules defining ranges including the key.

21. A network processor, comprising:
a plurality of packet engines;
a memory including at least one rule, wherein the memory is in communication with the packet engines;

a memory controller including comparators and circuitry enabled to perform:
  receiving a compare request;
  in response to the compare request, issuing a request to access a rule in the memory including a high and low values defining a range concurrently with issuing a request to access a key;
  receiving the key;
  buffering the accessed rule;
  transferring the high and low values of the accessed rule to the comparators;
  concurrently comparing, with the comparators, the received key with the high and low values to determine whether the key falls within the range defined by the high and low values;
  indicating in status information the rule in response to the key falling within the defined range of the rule; and
  performing an additional iteration of accessing a next rule, concurrently comparing the key with the high and low values of the next rule, and indicating in the status information the next rule in response to the key falling within a range defined by the next rule.

22. The network processor of claim 21, wherein the compare request is received from one packet engine and wherein the request to access the key is issued to the packet engine, wherein the key is received in response to the request for the key.

23. The network processor of claim 21, wherein the memory controller circuitry is further enabled to perform:
  issuing a request to access an additional rule from the memory in response to transferring the high and low values to the comparators for the additional iteration of accessing the high and low values; and
  buffering the high and low values for the accessed additional rule to enable streaming of the high and low values to the comparator to concurrently compare against the received key.

24. The network processor of claim 21, wherein the key comprises at least one parameter from a packet, and wherein the packet engine uses the status information to classify the packet including the key.

25. The network processor of claim 21, wherein the packet engine is further enabled to perform:
  issuing a compare request for the key, wherein the key is received in response to the compare request; and
  receiving the status information.

26. A network device, comprising:
  a switch fabric;
  a plurality of line cards coupled to the switch fabric, wherein each line card includes a network processor, wherein at least one network processor on the line cards includes:
    a plurality of packet engines;
    a memory including at least one rule, wherein the memory is in communication with the packet engines; and
    a memory controller including comparators and circuitry enabled to perform:
      receiving a compare request from one of the packet engines;
        in response to the compare request, issuing a request to access a rule in the memory including a high and low values defining a range concurrently with issuing a request to access a key;
      receiving the key;
      buffering the accessed rule;
      transferring the high and low values of the accessed rule to the comparators;
        concurrently comparing, with the comparators, the received key with the high and low values to determine whether the key falls within the range defined by the high and low values;
        indicating in status information the rule in response to the key falling within the defined range of the rule; and
        performing an additional iteration of accessing a next rule, concurrently comparing the key with the high and low values of the next rule, and indicating in the status information the next rule in response to the key falling within a range defined by the next rule.

27. The network device of claim 26, wherein the request to access the key is issued to the packet engine, wherein the key is received in response to the request for the key.

28. An article of manufacture enabled to cause operations to be performed, the operations comprising:
  receiving a compare request;
  in response to the compare request, issuing a request to access a rule from memory including a high and low values defining a range concurrently with issuing a request to access a key;
  receiving the key;
  buffering the accessed rule;
  transferring the high and low values of the accessed rule to comparators to concurrently compare the received key with the high and low values to determine whether the key falls within the range defined by the high and low values;
  indicating in status information the rule in response to the key falling within the defined range of the rule; and
  performing an additional iteration of accessing a next rule, concurrently comparing the key with the high and low values of the next rule, and indicating in the status information the next rule in response to the key falling within a range defined by the next rule.

29. The article of manufacture of claim 28, in communication with a programmable engine, wherein the compare request is received from the programmable engine and wherein the request to access the key is issued to the programmable engine, wherein the key is received in response to the request for the key.

30. The article of manufacture of claim 28, wherein the operations further comprise:
  issuing a request to access an additional rule in response to transferring the high and low values to the comparators for the additional iteration of accessing the high and low values; and
  buffering the high and low values for the accessed additional rule to enable streaming of the high and low values to the comparator to concurrently compare against the received key.

31. The article of manufacture of claim 28, wherein the received compare request indicates an address and size of a set of rules including at least one rule having high and low values defining a range, wherein the key is compared with the high and low values of the rules in the set to indicate in the status information rules defining ranges including the received key.

32. The article of manufacture of claim 29, wherein the operations further comprise:
  returning the status information indicating rules having high and low values defining ranges including the received key to the programmable engine.

33. The article of manufacture of claim 28, wherein the status information comprises a vector including a plurality of bits, each corresponding to one rule, wherein bit values for the bits indicate whether the key falls within the defined ranges of the rules.

34. The article of manufacture of claim 32, wherein the programmable engine comprises a packet engine and wherein the key comprises at least one parameter from a packet, and wherein the programmable engine uses the returned status information to classify the packet including the key.

35. The article of manufacture of claim 28, wherein the additional iteration is performed in response to the key not falling within the range defined by the accessed rule, and wherein the status information indicates only one rule defining the range including the key.

36. The article of manufacture of claim 28, wherein the additional iteration is performed in response to a next rule to consider, wherein the status information is enabled to indicate multiple rules defining ranges including the key.

* * * * *

UNITED STATES PATENT AND TRADEMARK OFFICE
CERTIFICATE OF CORRECTION

PATENT NO. : 7,340,570 B2 Page 1 of 1
APPLICATION NO. : 10/921547
DATED : March 4, 2008
INVENTOR(S) : Sridhar Lakshmanamurthy et al.

It is certified that error appears in the above-identified patent and that said Letters Patent is hereby corrected as shown below:

Col. 10, Line 40, delete "farther enabled" and replace with --further enabled--.

Signed and Sealed this

Twenty-eighth Day of September, 2010

David J. Kappos
*Director of the United States Patent and Trademark Office*